United States Patent
Yang et al.

(10) Patent No.: US 10,068,524 B2
(45) Date of Patent: Sep. 4, 2018

(54) PIXEL DRIVING CIRCUIT, DISPLAY SUBSTRATE AND DRIVING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Xiaochuan Chen, Beijing (CN); Yingming Liu, Beijing (CN); Weijie Zhao, Beijing (CN); Rui Xu, Beijing (CN); Chen Meng, Beijing (CN); Jing Xue, Beijing (CN); Ruijun Dong, Beijing (CN); Jing Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/118,389

(22) PCT Filed: Dec. 21, 2015

(86) PCT No.: PCT/CN2015/098098
§ 371 (c)(1),
(2) Date: Mar. 29, 2017

(87) PCT Pub. No.: WO2017/004946
PCT Pub. Date: Jan. 12, 2017

(65) Prior Publication Data
US 2018/0137814 A1 May 17, 2018

(30) Foreign Application Priority Data

Jul. 6, 2015 (CN) .......................... 2015 1 0391775

(51) Int. Cl.
G09G 3/32 (2016.01)
G09G 3/3233 (2016.01)
G06F 3/041 (2006.01)

(52) U.S. Cl.
CPC ......... *G09G 3/3233* (2013.01); *G06F 3/0418* (2013.01); *G09G 3/32* (2013.01);
(Continued)

(58) Field of Classification Search
CPC ................ G06F 3/0418; G09G 3/3233; G09G 2300/0842; G09G 2320/0233; G09G 2354/00
See application file for complete search history.

(56) References Cited

U.S. PATENT DOCUMENTS

2013/0057511 A1* 3/2013 Shepelev ................ G06F 3/044
345/174
2013/0194248 A1 8/2013 Kim
(Continued)

FOREIGN PATENT DOCUMENTS

CN 103150991 A 6/2013
CN 104076966 A 10/2014
(Continued)

OTHER PUBLICATIONS

China Office Action, Application No. 201510391775.0, dated Jan. 16, 2017, 22 pps, including English translation.
Chinese International Search Report, Application No. PCT/CN2015/098098, dated Mar. 18, 2016, 11 pps, including English translation.
(Continued)

*Primary Examiner* — Robert Michaud
(74) *Attorney, Agent, or Firm* — Armstrong Teasdale LLP

(57) ABSTRACT

The present disclosure provides a pixel driving circuit, a display substrate and a driving method thereof, and a display (Continued)

device. The pixel driving circuit includes a driving unit, a data voltage write unit, an energy storage unit, a threshold compensation unit, and a touch driving compensation unit. The energy storage unit comprises a first energy storage end and a second energy storage end. The touch driving compensation unit is connected to the second energy storage end of the energy storage unit to compensate the voltage of the second energy storage end in a touch phase, so as to maintain that driving current generated by the driving unit does not vary with time. The pixel driving circuit provided by the present disclosure can allow luminance of a driven electroluminescent element does not vary with time in a touch phase, thereby avoiding affecting light emission display of the driven electroluminescent element.

18 Claims, 8 Drawing Sheets

(52) U.S. Cl.
CPC ............... *G09G 2300/0842* (2013.01); *G09G 2320/0233* (2013.01); *G09G 2354/00* (2013.01)

(56) References Cited

U.S. PATENT DOCUMENTS

| | | | |
|---|---|---|---|
| 2014/0118231 A1* | 5/2014 | Yang | G09G 3/3258 |
| | | | 345/82 |
| 2015/0035798 A1 | 2/2015 | Zhou et al. | |
| 2015/0187276 A1* | 7/2015 | Shim | G09G 3/3233 |
| | | | 345/77 |

FOREIGN PATENT DOCUMENTS

| | | |
|---|---|---|
| CN | 104091563 A | 10/2014 |
| CN | 104217677 A | 12/2014 |
| CN | 104299571 A | 1/2015 |
| CN | 104575398 A | 4/2015 |
| CN | 103383837 B | 7/2015 |
| CN | 104751781 A | 7/2015 |
| CN | 104933991 A | 9/2015 |
| KR | 1411752 B1 | 7/2014 |

OTHER PUBLICATIONS

International Search Report and Written Opinion, dated Mar. 24, 2016, for co-pending International application No. PCT/CN2015/098098 (14 pgs.).

\* cited by examiner

US 10,068,524 B2

PIXEL DRIVING CIRCUIT, DISPLAY SUBSTRATE AND DRIVING METHOD THEREOF, AND DISPLAY DEVICE

CROSS REFERENCE TO RELATED APPLICATIONS

This application is a National Stage Entry of PCT/CN2015/098098 filed Dec. 21, 2015, which claims the benefit and priority of Chinese Patent Application No. 201510391775.0 filed Jul. 6, 2015, both of which are incorporated herein by reference in their entirety.

BACKGROUND

The present disclosure relates to the field of display technologies, and more particularly, to a pixel driving circuit, a display substrate and a driving method thereof, and a display device.

In one aspect, with respect to an existing display device, an organic light emitting diode (OLED) functioning as a current-mode light-emitting device is increasingly used in the field of high performance display due to its characteristics such as autoluminescence, fast response, wide viewing angle, availability of being fabricated on a flexible substrate, etc. OLED display devices may be classified into two types according to different drive modes, namely, a passive matrix driving OLED (PMOLED) and an active matrix driving OLED (AMOLED). An AMOLED display is expected to replace a liquid crystal display (LCD) and become a next-generation new-type flat panel display due to its advantages such as low manufacturing cost, high response speed, power saving, DC drive, portability and wide working temperature range, etc.

In another aspect, with rapid progress of display technologies, a display device having touch function becomes gradually and increasingly popular with people due to its advantages such as a visualized operation etc. In an existing OLED display device, a cathode of OLED therein is reused as a touch electrode. In this way, an entire thickness of the display device may be reduced. When the cathode is reused as the touch electrode, a touch drive signal needs to be applied to the cathode, which may cause that electric current flowing through OLED changes because the voltage of the touch drive signal varies with time, thereby making luminance of the OLED vary with time and affecting light emission display.

BRIEF DESCRIPTION

In one aspect, a pixel driving circuit is provided. The pixel driving circuit includes a driving unit, a data voltage write unit, an energy storage unit, a threshold compensation unit and a touch driving compensation unit. The energy storage unit includes a first energy storage end and a second energy storage end. The driving unit is connected to the first energy storage end, and is configured to generate a driving current for driving an electroluminescent element connected to the pixel driving circuit according to a difference value between a voltage of the first energy storage end and a threshold voltage of the driving unit. The data voltage write unit is connected to the driving unit, and is configured to write a data voltage into the driving unit. The energy storage unit is configured to maintain a voltage difference between the first energy storage end and the second energy storage end when the first energy storage end is floating. The threshold compensation unit is connected to the driving unit and the first energy storage end, and is configured to compensate voltage of the first energy storage end, such that the voltage equals to a sum of the data voltage and the threshold voltage. The touch driving compensation unit is connected to the second energy storage end, and is configured to compensate a voltage of the second energy storage end in a touch phase, so as to maintain that driving current generated by the driving unit does not vary with time.

Embodiments In embodiments of the present disclosure, the touch driving compensation unit comprises a first switching transistor, a compensation voltage input end and a first control signal input end. A first electrode of the first switching transistor is connected to the compensation voltage input end, a second electrode of the first switching transistor is connected to the second energy storage end, and a control electrode of the first switching transistor is connected to the first control signal input end. The compensation voltage input end is configured to input a touch drive signal.

In the embodiments of the present disclosure, the driving unit includes a drive transistor, and a control electrode of the drive transistor is connected to the first energy storage end.

In the embodiments of the present disclosure, the energy storage unit includes a capacitor connected between the first energy storage end and the second energy storage end.

In the embodiments of the present disclosure, the threshold compensation unit includes a second switching transistor and a second control signal input end, wherein a first electrode of the second switching transistor is connected to a second electrode of the drive transistor, a second electrode of the second switching transistor is connected to the first energy storage end, and a control electrode of the second switching transistor is connected to the second control signal input end.

The data voltage write unit includes a third switching transistor, a data voltage writing end and a third control signal input end, wherein a first electrode of the third switching transistor is connected to the data voltage writing end, a second electrode of the third switching transistor is connected to a first electrode of the drive transistor, and a control electrode of the third switching transistor is connected to the third control signal input end.

In the embodiments of the present disclosure, the second control signal input end and the third control signal input end are the same control signal input end, and the electric levels for turning on the second switching transistor and the third switching transistor are the same.

In the embodiments of the present disclosure, a reset unit is further included, wherein the reset unit is connected to the first energy storage end and the second energy storage end, and is configured to reset the first energy storage end and the second energy storage end.

In the embodiments of the present disclosure, the reset unit includes a fourth switching transistor, a fifth switching transistor, a fourth control signal input end, a fifth control signal input end and a reset voltage input end. A first electrode of the fourth switching transistor is connected to the second energy storage end, a second electrode is connected to the reset voltage input end, and a control electrode is connected to the fourth control signal input end. A first electrode of the fifth switching transistor is connected to the second energy storage end, a second electrode is connected to the first energy storage end, and a control electrode is connected to the fifth control signal input end.

In the embodiments of the present disclosure, a light emission control unit is further included, wherein the light emission control unit is connected to the driving unit, and is configured to control the input of an electric current generated by the driving unit to the electroluminescent element.

In the embodiments of the present disclosure, the light emission control unit includes a sixth switching transistor, a seventh switching transistor, a work voltage input end and a sixth control signal input end. A first electrode of the sixth switching transistor is connected to the work voltage input end, a second electrode of the sixth switching transistor is connected to the second electrode of the third switching transistor and the first electrode of the drive transistor. A first electrode of the seventh switching transistor is connected to the first electrode of the second switching transistor and the second electrode of the drive transistor, and a second electrode of the seventh switching transistor is connected to the electroluminescent element. The electric levels for turning on the sixth switching transistor and the seventh switching transistor are the same, and the sixth control signal input end and the seventh control signal input end are the same control signal input end.

In the embodiments of the present disclosure, all the switching transistors and the drive transistor are P-type transistors. The control electrode of each of the P-type transistors is a gate electrode, the first electrode is a source electrode, and the second electrode is drain electrode.

In a second aspect, a display substrate is provided. The display substrate includes a base, an electroluminescent element array formed on the base, a pixel driving circuit array for driving each electroluminescent element in the electroluminescent element array, and a plurality of display signal lines, wherein the pixel driving circuit array includes a plurality of foregoing pixel driving circuits, the plurality of display signal lines are respectively connected to the input ends in the pixel driving circuit. The electroluminescent element array comprises a first electrode pattern, a second electrode pattern, and an electroluminescent layer disposed between the first electrode pattern and the second electrode pattern. The first electrode pattern includes a plurality of first electrodes, wherein each of the first electrodes is connected to the corresponding pixel driving circuit.

The display substrate further includes a plurality of touch signal lines, the second electrode pattern comprises a plurality of second electrodes, and the second electrodes are connected to the touch signal lines and function as touch electrodes.

In the embodiments of the present disclosure, the second electrodes in the second electrode pattern are divided into a plurality of rows, the second electrodes in odd-numbered rows and the second electrodes in even-numbered rows are disposed in a staggered manner in a column direction. In each odd-numbered row, the second electrodes in the same row are connected to the same touch signal line. In the even-numbered rows, the second electrodes in the same column are connected to the same touch signal line.

In a third aspect, a method for driving the foregoing display substrate, including a light emission phase which includes a touch phase is provided, wherein in the touch phase of the light emission phase, a touch drive signal is applied to second electrodes in the second electrode pattern through the touch signal lines, and the touch driving compensation unit is controlled through the display signal lines to compensate the voltage of the second energy storage end, so as to maintain that electric current generated by the driving unit does not vary with time.

In the embodiments of the present disclosure, in the touch phase, a difference value between the voltage of a display drive signal applied to each display signal line and the voltage of the touch drive signal does not vary with time.

In a fourth aspect, a display device is provided. The display device includes the foregoing display substrate.

The pixel driving circuit provided by the embodiments of the present disclosure includes a touch driving compensation unit which can compensate the voltage of the second energy storage end in a touch phase, so as to maintain that driving current generated by the driving unit does not vary with time. In this way, in the touch phase, luminance of a driven electroluminescent element does not vary with time, thereby avoiding affecting light emission display of the driven electroluminescent element.

BRIEF DESCRIPTION OF THE DRAWINGS

To describe technical solutions of embodiments of the present disclosure more clearly, the following will briefly introduce the accompanying drawings of the embodiments. It should be known that the accompanying drawings in the following description are merely associated with some embodiments of the present disclosure, but do not limit the present disclosure, in which.

DETAILED DESCRIPTION

The following further describes the concrete implementation manners of the present disclosure with reference to the accompanying drawings and embodiments. The following embodiments are merely intended to more clearly describe the technical solutions of the present disclosure, but not to limit the protection scope of the present disclosure.

Figure 1:
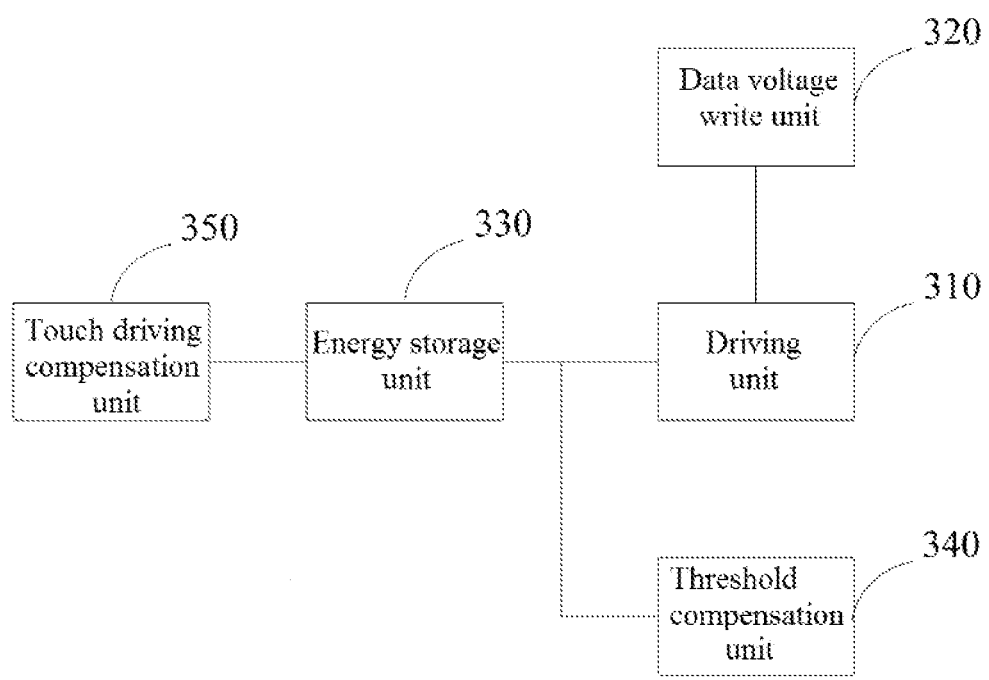
FIG. 1 is a block diagram of a pixel driving circuit according to a first embodiment of the present disclosure.

FIG. 1 is a block diagram of a pixel driving circuit according to a first embodiment of the present disclosure. As shown in FIG. 1, the pixel driving circuit of this embodiment may be configured to drive an electroluminescent element, whose cathode is reused as a touch electrode, to display. As shown in FIG. 1, the pixel driving circuit may include a driving unit 310, a data voltage write unit 320, an energy storage unit 330, a threshold compensation unit 340 and a touch driving compensation unit 350. The energy storage unit 330 includes a first energy storage end and a second energy storage end. The driving unit 310 is connected to the first energy storage end to generate a driving current for driving the electroluminescent element connected to the pixel driving circuit according to a difference value between voltage of the first energy storage end and a threshold voltage of the driving unit 310. The data voltage write unit 320 is connected to the driving unit 310 to input data voltage to the driving unit 310. The energy storage unit 330 is configured to maintain a voltage difference between the first energy storage end and the second energy storage end when the first energy storage end is floating. The threshold compensation unit 340 is connected to the driving unit 310 and the first energy storage end to compensate the voltage of the first energy storage end, such that the voltage equals to a sum of the data voltage and the threshold voltage. The touch driving compensation unit 350 is connected to the second energy storage end to make driving compensation on the voltage of the second energy storage end in a touch phase, so as to maintain that the driving current generated by the driving unit 310 does not vary with time.

The pixel driving circuit provided by the embodiments of the present disclosure includes the touch driving compensation unit 350 which can make driving compensation on the voltage of the second energy storage end in a touch phase, so as to maintain that driving current generated by the driving unit 310 does not vary with time. In this way, in the touch phase, luminance of the driven electroluminescent element does not vary with time, thereby avoiding affecting the light emission display of the driven electroluminescent element.

The "floating" here is consistent with what is understood in the prior art. For example, the first energy storage end being floating means a state in which the first energy storage end is neither supplied with voltage nor grounded so that electric charge is unable to flow in or flow out.

Figure 2:
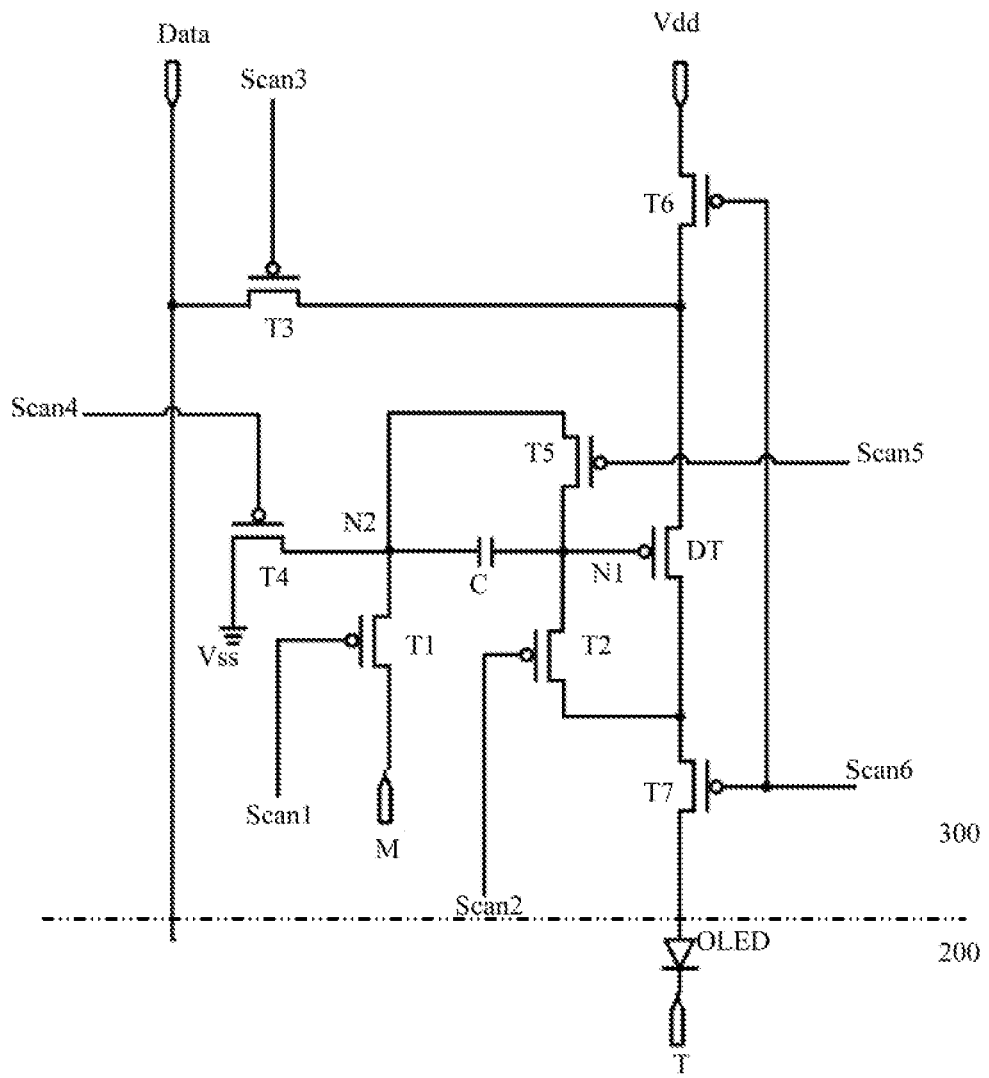
FIG. 2 is a schematic circuit diagram of the pixel driving circuit according to the embodiment as shown in FIG. 1.

FIG. 2 is a schematic circuit diagram of the pixel driving circuit according to the embodiment as shown in FIG. 1. As shown in FIG. 2, the touch driving compensation unit 350 of this embodiment may specifically include a first switching transistor T1, a compensation voltage input end M and a first control signal input end Scan1. A source electrode of the first switching transistor T1 is connected to the compensation voltage input end M, a drain electrode is connected to the second energy storage end, and a gate electrode is connected to the first control signal input end Scan1. The compensation voltage input end M is configured to input a touch drive signal. Thus, by way of appropriate control, the voltage of the second energy storage end is compensated in real time to be the voltage of the touch drive signal inputted on the voltage input end M. The voltage difference between the second energy storage end and the first energy storage end maintains when the first energy storage end is floating, which enables the voltage of the first energy storage end to synchronously increase by a voltage equal to the voltage of the touch drive signal, thereby counteracting the impact of the touch drive signal applied to the cathode of the electroluminescent element on electric current flowing through the electroluminescent element.

The driving unit 310 may include a drive transistor (in the following, reference is made by taking an example in which the drive transistor is a P-type transistor). A gate electrode of the P-type drive transistor is connected to the first energy storage end. The energy storage unit 330 may include a capacitor C connected between the first energy storage end and the second energy storage end. Of course, in practical application, the foregoing driving unit 310 and the energy storage unit 330 may be replaced with other components having the same functions.

In the embodiments of the present disclosure, the threshold compensation unit 340 includes a second switching transistor T2 and a second control signal input end Scan2, wherein a source electrode of the second switching transistor T2 is connected to a drain electrode of the P-type drive transistor, a drain electrode is connected to the first energy storage end, and a gate electrode is connected to the second control signal input end Scan2.

The data voltage write unit 320 includes a third switching transistor T3, a data voltage writing end Data and a third control signal input end Scan3. A source electrode of the third switching transistor T3 is connected to the data voltage writing end, a drain electrode is connected to a source electrode of the P-type drive transistor, and a gate electrode is connected to the third control signal input end.

In this way, the data voltage write unit 320 can write data voltage into the source electrode of the P-type drive transistor, so that the P-type drive transistor may be turned on by the data voltage. The threshold compensation unit 340 may be connected to the drain electrode and the gate electrode of the P-type drive transistor, and the gate electrode of the P-type drive transistor is connected to a first end of the energy storage unit 330. Therefore, voltage of the gate electrode of the P-type drive transistor may gradually rise until it reaches the sum of the data voltage and the threshold voltage (a threshold of the P-type drive transistor generally is a negative value). In this way, a process of voltage writing and threshold compensation is completed. In a subsequent light emission process, the gate voltage of the P-type drive transistor is the sum of the data voltage and the threshold voltage, thus driving current generated by the drive transistor may be unrelated to the threshold voltage but is related to the data voltage, thereby avoiding threshold shift of the drive transistor to affect light emission display of the electroluminescent element.

In practical application, the foregoing threshold compensation module and the data voltage writing module may also be other structures as long as they can implement functions of the voltage writing and the threshold compensation, and specific structures of the threshold compensation module and the data voltage writing module may not affect the protection scope of the present disclosure.

In the embodiments of the present disclosure, the second control signal input end Scan2 and the third control signal input end Scan3 may be the same control signal input end, and the electric levels for turning on the second switching transistor T2 and the third switching transistor T3 are the same. In this way, the data voltage writing and the threshold compensation may be carried out simultaneously, reducing the use of one control signal input end.

Further, the foregoing pixel driving circuit may further include a reset unit, wherein the reset unit is connected to the first energy storage end and the second energy storage end, and is configured to reset the first energy storage end and the second energy storage end.

In this way, reset of the first energy storage end and the second energy storage end can be implemented, thereby avoiding affecting light emission display of a next frame. In some pixel driving circuits, the foregoing reset unit is not an indispensable structure, and a technical solution in which no reset unit is provided also falls within the protection scope of the present disclosure.

In the embodiments of the present disclosure, the reset unit includes a fourth switching transistor T4, a fifth switching transistor T5, a fourth control signal input end Scan4, a fifth control signal input end Scan5 and a reset voltage input end Vss, wherein a drain electrode of the fourth switching transistor T4 is connected to the reset voltage input end Vss, a source electrode is connected to the second energy storage end, and a gate electrode is connected to the fourth control signal input end Scan4. A source electrode of the fifth switching transistor T5 is connected to the second energy storage end, a drain electrode is connected to the first energy storage end, and a gate electrode is connected to the fifth control signal input end Scan5.

Further, in the embodiments of the present disclosure, the foregoing pixel driving circuit may further include a light emission control unit, wherein the light emission control unit is connected to the driving unit 310, and is configured to control the input of an electric current generated by the driving unit 310 to a corresponding electroluminescent element.

Specifically, the light emission control unit 310 includes a sixth switching transistor T6, a seventh switching transistor T7, a work voltage input end Vdd, a sixth control signal input end Scan6 and a seventh control signal input end Scan6, wherein a source electrode of the sixth switching transistor T6 is connected to the work voltage input end Vdd, a drain electrode is connected to the drain electrode of the third switching transistor T3 and the source electrode of the P-type drive transistor, and a gate electrode is connected to the sixth control signal input end Scan6. A source electrode of the seventh switching transistor is connected to the source electrode of the second switching transistor and the drain electrode of the P-type drive transistor, a drain electrode is connected to a corresponding electroluminescent element, and a gate electrode is connected to the seventh control signal input end Scan6.

Further, the electric levels for turning on the sixth switching transistor T6 and the seventh switching transistor T7 are the same, and the sixth control signal input end Scan6 and the seventh control signal input end Scan6 are the same control signal input end Scan6.

The sixth switching transistor T6 and the seventh switching transistor T7 are set as transistors having the same electric level for turning on and are connected to the same control signal input end Scan6, which may also reduce the number of used signal input ends.

In the embodiments of the present disclosure, all the switching transistors may be P-type transistors. The advantage is that various switching transistors and the drive transistor may be fabricated by means of a unified fabrication process so that fabrication difficulty is reduced. Of course, in practical application, a part of the transistors or all the transistors may be replaced with N-type drive transistors, and corresponding technical solutions may not depart from the scope of the present disclosure.

A description is made in the following with reference to a drive process of the pixel driving circuit.

As shown in FIG. 2, in the embodiments of the present disclosure, the foregoing pixel driving circuit may include seven P-type switching transistors T1-T7, one P-type drive transistor DT and one capacitor C, and the pixel driving circuit is connected to an anode of the electroluminescent element (expressed as OLED in FIG. 2). The foregoing pixel driving circuit 300 further includes control signal input ends Scan1-Scan6, a data voltage writing end Data and a compensation voltage input end M, additionally including a work voltage input end Vdd and a reset voltage input end Vss. The source electrode of the first switching transistor T1 is connected to the compensation voltage input end M, the drain electrode is connected to a second node N2, and the gate electrode is connected to the first control signal input end Scan1. The source electrode of the second switching transistor T2 is connected to a drain electrode of the P-type drive transistor DT, the drain electrode is connected to a first node N1, and the gate electrode is connected to the second control signal input end Scan2. The source electrode of the third switching transistor T3 is connected to the data voltage writing end Data, the drain electrode is connected to a source electrode of the P-type drive transistor DT, and the gate electrode is connected to the third control signal input end Scan3. The drain electrode of the fourth switching transistor T4 is connected to the reset voltage input end Vss, the source electrode is connected to the second node N2, and the gate electrode is connected to the fourth control signal input end Scan4. The drain electrode of the fifth switching transistor T5 is connected to the first node N1, the source electrode is connected to the second node N2, and the gate electrode is connected to the fifth control signal input end Scan5. The source electrode of the sixth switching transistor T6 is connected to the work voltage input end Vdd, and the drain electrode is connected to the drain electrode of the third switching transistor T3 and the source electrode of the P-type drive transistor DT. The source electrode of the seventh switching transistor T7 is connected to the source electrode of the second switching transistor T2 and the drain electrode of the P-type drive transistor DT, and the drain electrode is connected to the anode of the electroluminescent element OLED. The gate electrodes of the sixth switching transistor T6 and of the seventh switching transistor T7 are connected to the sixth control signal input end Scan6, one electrode plate of the capacitor C is connected to the first node N1, and the other electrode plate is connected to the second node N2.

By using an appropriate driving method, the pixel driving circuit provided by the embodiments of the present disclosure may avoid threshold shift of the drive transistor from affecting light emission display and avoid a touch drive signal applied to the cathode from affecting light emission display. A description of working principles of the pixel driving circuit in FIG. 2 is made in the following with reference to FIG. 3-FIG. 7.

Figure 3:
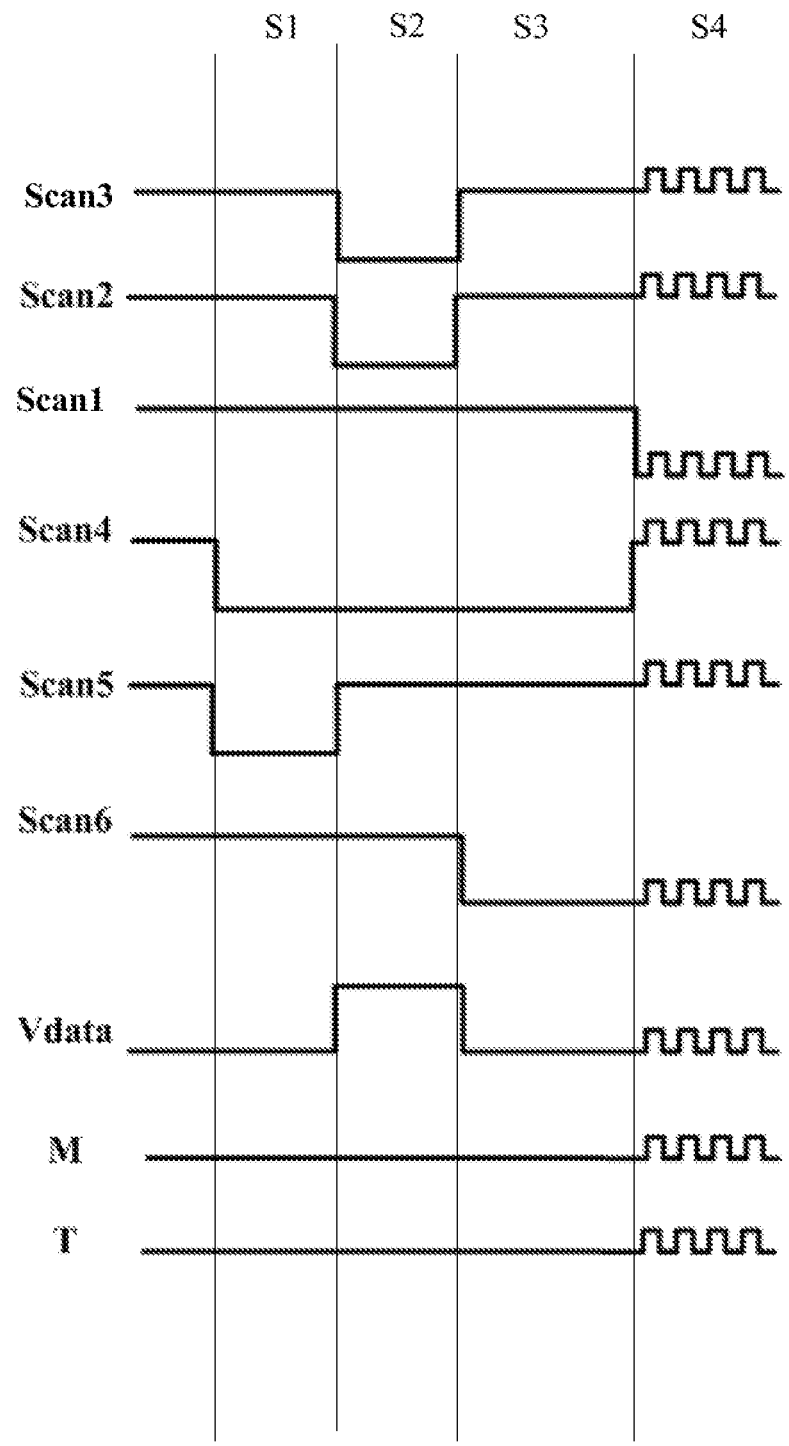
FIG. 3 is a work timing diagram of the pixel driving circuit according to the embodiment as shown in FIG. 2.

FIG. 3 is a work timing diagram of the pixel driving circuit according to the embodiment as shown in FIG. 2. As shown in FIG. 3, a drive process of the pixel driving circuit in FIG. 2 may be divided into four phases.

Figure 4:
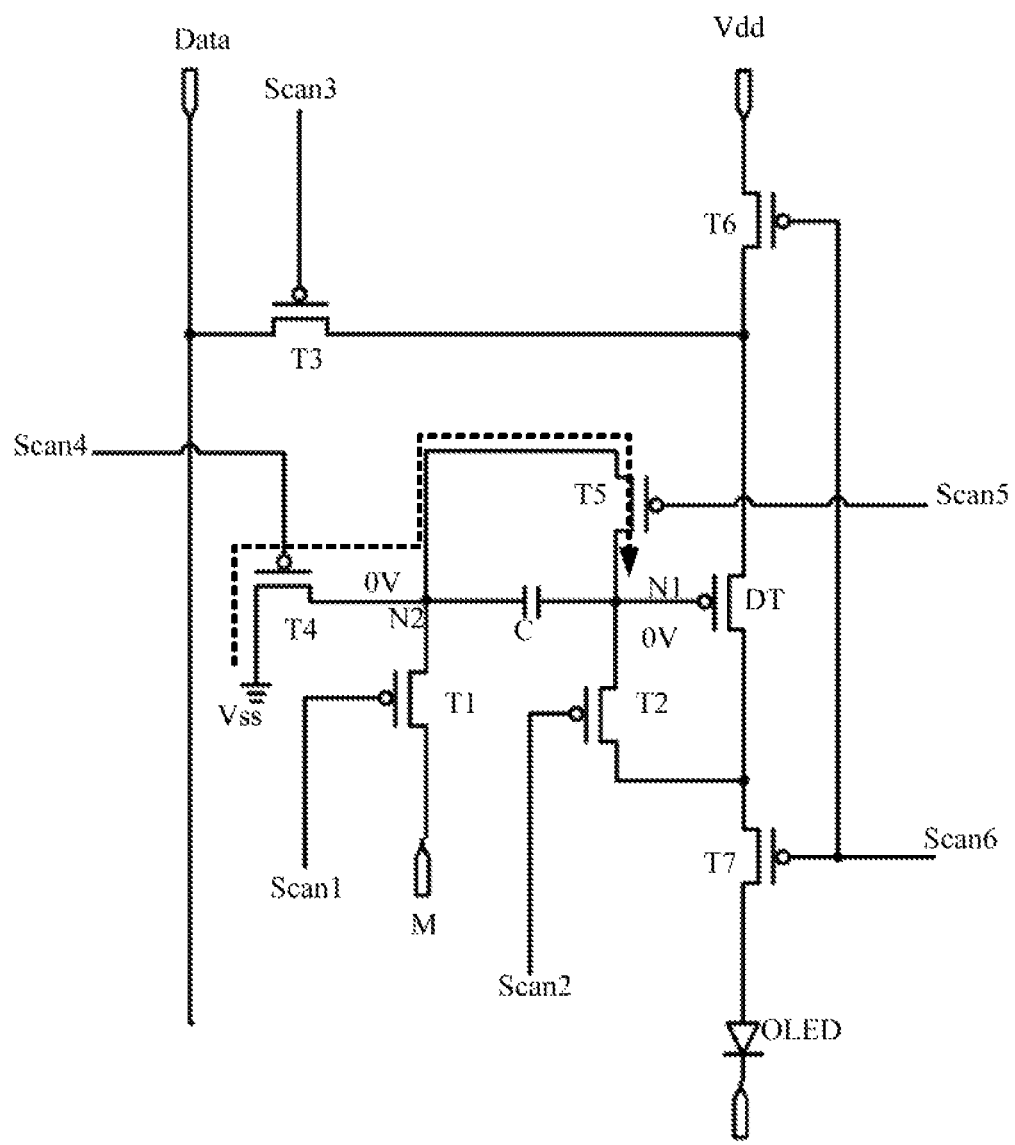
FIG. 4 is a schematic state diagram of the pixel driving circuit in a first phase according to the embodiment as shown in FIG. 2.

FIG. 4 is a schematic state diagram of the pixel driving circuit in a first phase according to the embodiment as shown in FIG. 2. The first phase S1 is a reset phase, during which a low-level voltage is applied to the control signal input ends Scan4 and Scan5, and a high-level voltage is applied to the other control signal input ends. As shown in FIG. 4, at the moment, the fourth switching transistor T4 and the fifth switching transistor T5 are turned on, the other switching transistors are turned off, the reset voltage input end Vss is connected through T4 with the second node N2, and is connected through T4, T5 with the first node N1, and the voltages of the second node N2 and the first node N1 are reset (for example, reset to 0V).

In the present disclosure, applying a low-level voltage to the control signal input ends Scan4 and Scan5 refers that corresponding signals are applied to display signal lines respectively connected to the control signal input ends Scan4 and Scan5, and similarly, voltages or signals applied to each input end in the following is also applied through the signal lines connected to the corresponding input ends.

Figure 5:
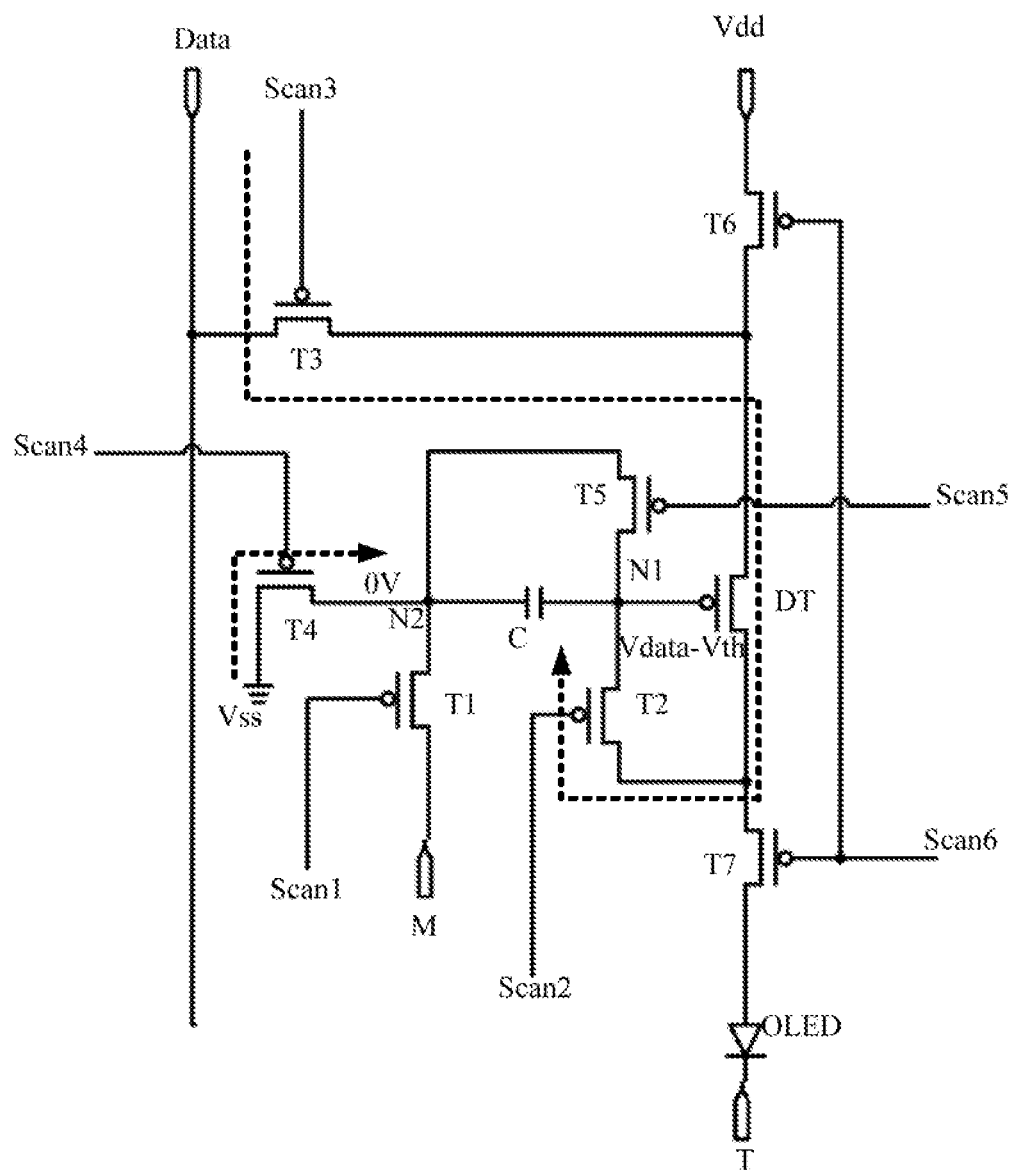
FIG. 5 is a schematic state diagram of the pixel driving circuit in a second phase according to the embodiment as shown in FIG. 2.

FIG. 5 is a schematic state diagram of the pixel driving circuit in a second phase according to the embodiment as shown in FIG. 2. The second phase S2 is a charging phase, during which a low level voltage is applied to the control signal input ends Scan2, Scan3 and Scan4, and a high level voltage is applied to the other control signal input ends, and a corresponding data voltage Vdata is applied to the data voltage writing end Data. As shown in FIG. 5, at the moment, the second switching transistor T2 and the third switching transistor T3 are turned on, the first node N1 is charged by the data voltage writing end Data through the third switching transistor T3, the drive transistor DT and the second switching transistor T2, upon completion of charging, voltage of the first node N1 is set to Vdata−Vth, wherein Vth represents the threshold voltage of the drive transistor DT. The fourth switching transistor T4 continues to be turned on, and voltage of the second node N2 is maintained to be reset voltage of 0V.

Figure 6:
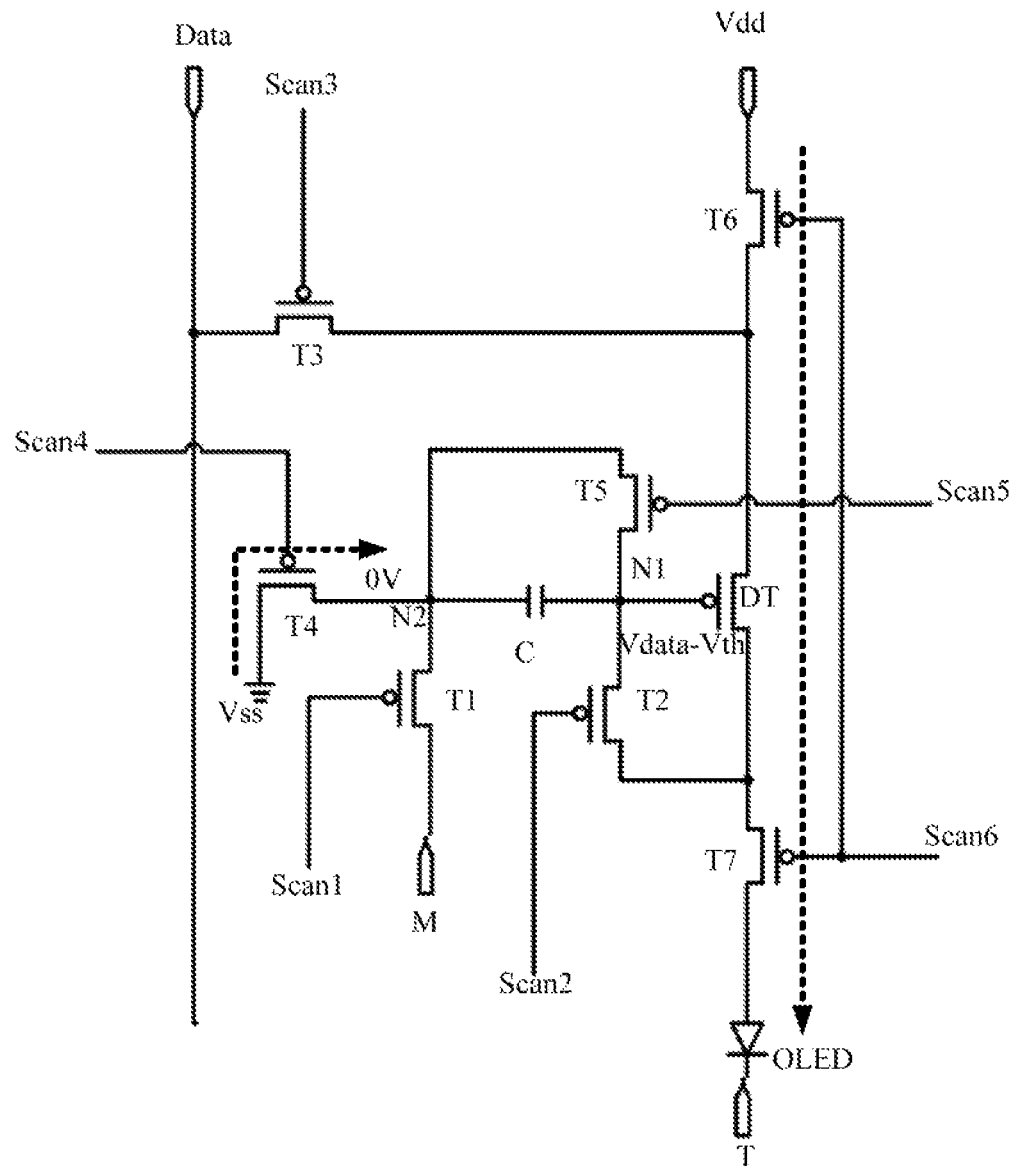
FIG. 6 is a schematic state diagram of the pixel driving circuit in a third phase according to the embodiment as shown in FIG. 2.

FIG. 6 is a schematic state diagram of the pixel driving circuit in a third phase according to the embodiment as shown in FIG. 2. The third phase S3 is a separate light emission phase, during which a low level voltage is applied to the control signal input ends Scan6 and Scan4, and a high level voltage is applied to the other control signal input ends. As shown in FIG. 6, at the moment, the seventh switching transistor T7 and the sixth switching transistor T6 are turned on, the work voltage input end Vdd supplies power to the electroluminescent element OLED through the sixth switching transistor T6, the drive transistor DT and the seventh switching transistor T7, and at the moment the electroluminescent element OLED emits light. The fourth switching transistor T4 continues to be turned on, and the voltage of the second node N2 is maintained to be the reset voltage.

Light emission current flowing through OLED may be obtained according to a saturation current formula: $I=K(Vgs-Vth)^2=K(Vvdd-(Vdata-Vth)-Vth)=K(Vvdd-Vdata)^2$, wherein Vgs expresses a voltage difference between the gate electrode and the source electrode of the drive transistor DT, K is a constant related to the drive transistor DT, and Vvdd is work voltage inputted at the work voltage input end Vdd.

The light emission current is unrelated to the threshold Vth of the drive transistor DT, thereby avoiding threshold shift of the drive transistor from affecting light emission display.

Figure 7:
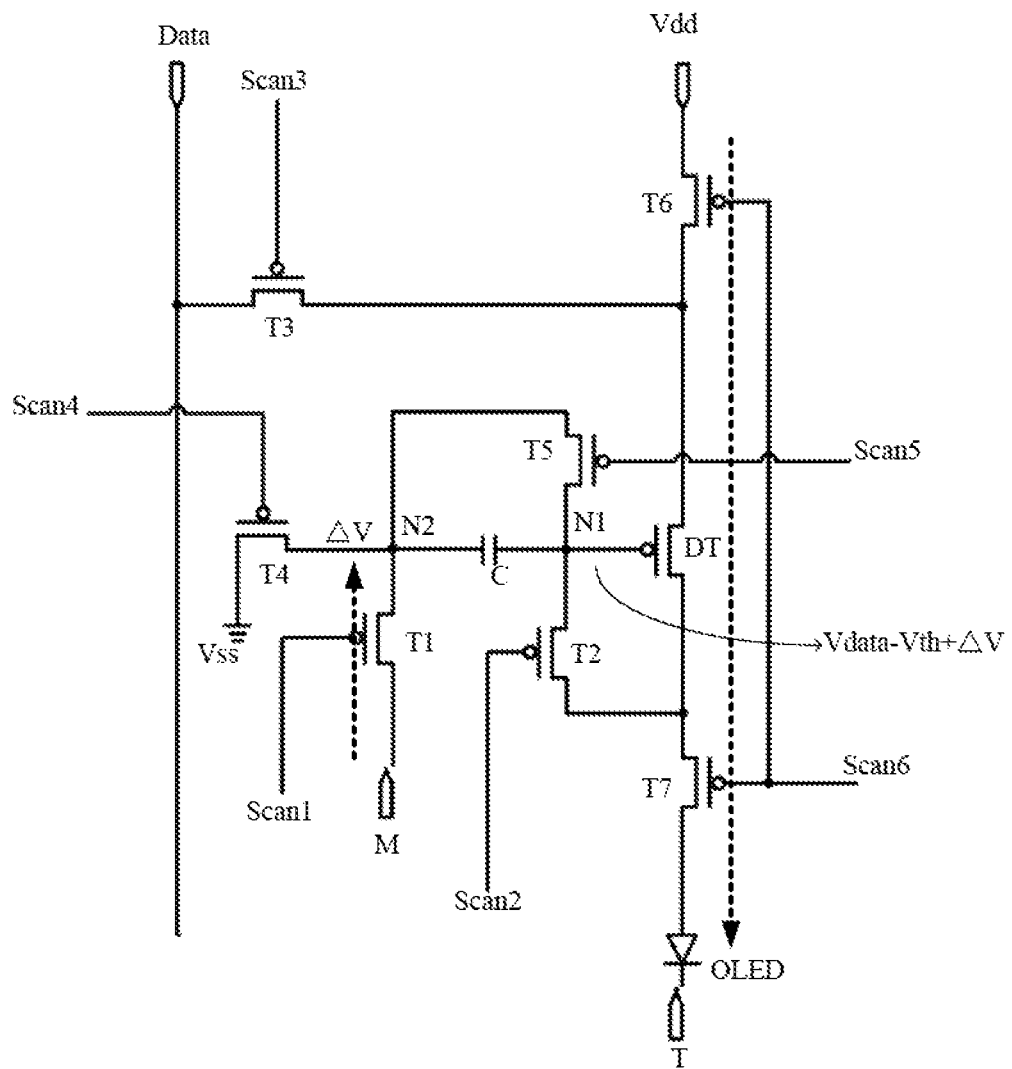
FIG. 7 is a schematic state diagram of the pixel driving circuit in a fourth phase according to the embodiment as shown in FIG. 2.

FIG. 7 is a schematic state diagram of the pixel driving circuit in a fourth phase according to the embodiment as shown in FIG. 2. The fourth phase S4 is a light emission and touch phase, during which, the light emission and the touch are carried out simultaneously. In this phase, a low level voltage is applied to the control signal input ends Scan1 and Scan6, a high level voltage is applied to the other control signal input ends, and a touch drive signal is applied to the compensation voltage input end M and the cathode T of OLED. As shown in FIG. 7, at the moment, the sixth switching transistor T6 and the seventh switching transistor T7 continue to be turned on, and the first switching transistor T1 is turned on. Two ends of the capacitor C are floating, so that a voltage difference between the first node N1 and the second node N2 maintains unchanged, thus, voltage of the second node N2 is also set to ΔV when voltage of the touch drive signal is ΔV, and correspondingly, voltage of the first node N1 leaps to Vdata−Vth+ΔV, at the moment, the source voltage Vvdd also changes to Vvdd+ΔV.

It may be seen according to the saturation current formula that at the moment, $I=K(Vgs-Vth)^2=K(Vvdd+\Delta V-(Vdata-Vth+\Delta V)-Vth)=K(Vvdd-Vdata)^2$. As can be seen, electric current flowing through the electroluminescent element OLED maintains consistent in that in the separate light emission phase S3. That is, the electric current at the moment is not affected by variation of the voltage of the touch drive signal applied to the cathode T. In addition, in this phase, the voltage of the signal applied to each display drive signal line synchronously fluctuates with the voltage of the touch drive signal, with an amplitude being equal to a fluctuation amplitude of the voltage of the touch drive signal, which may effectively reduce a transmission delay of the touch drive signal caused by a capacitance between the cathode, the touch drive signal lines and the display signal lines.

In the foregoing pixel driving circuit, the first switching transistor T1, the compensation voltage input end M and the control signal input end Scan1 jointly achieve the function of the compensation of the touch drive voltage, functioning as the touch driving compensation unit 350 in the pixel driving circuit. The third switching transistor T3, the data voltage writing end Data and the control signal input end Scan3 jointly constitute the data voltage write unit 320, and the second switching transistor T2 and the control signal input end Scan2 jointly constitute the threshold compensation unit 340. The fourth switching transistor T4, the fifth switching transistor T5, the control signal input ends Scan4, Scan5 and the reset voltage input end Vss respectively connected to T4, T5 jointly achieve the reset function, and function as the reset unit in the pixel driving circuit. The sixth switching transistor T6, the seventh switching transistor T7, the control signal input end Scan6 and the work voltage input end Vdd connected to T6 and T7 jointly achieve the function of light emission control, and function as the light emission control unit in the pixel driving circuit. The capacitor C constitutes the energy storage unit 330. In order to achieve basic objectives of the present disclosure, the foregoing function units are not necessarily set as the same as shown in FIG. 7, and are not indispensable structures in some pixel driving circuits.

Furthermore, in the embodiments of the present disclosure, control signals applied to the foregoing control signal input ends Scan2 and Scan3 are same, and the control signal input ends Scan2 and Scan3 may be the same control signal input end and connected to the same display control line.

Figure 8:
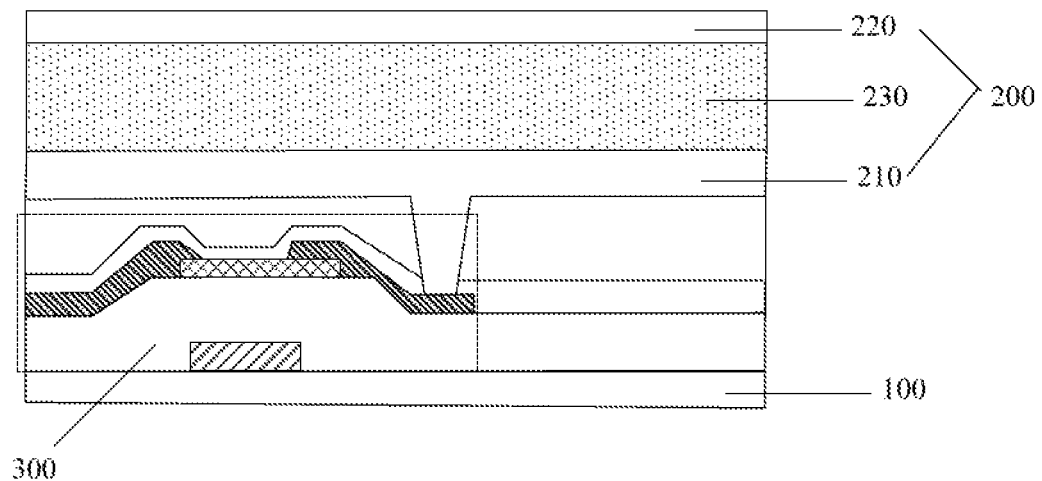
FIG. 8 is a schematic structural diagram of a pixel unit in a display substrate according to a second embodiment of the present disclosure.

FIG. 8 is a schematic structural diagram of a pixel unit in a display substrate according to a second embodiment of the present disclosure. The second embodiment of the present disclosure provides a display substrate including the foregoing pixel driving circuit, wherein the display substrate includes a base 100, an electroluminescent element array formed on the base 100, a pixel driving circuit array for driving each electroluminescent element in the electroluminescent element array, and a plurality of display signal lines, wherein a pixel driving circuit 300 in the pixel driving circuit array is the foregoing pixel driving circuit, the plurality of display signal lines are respectively connected to the corresponding input ends in the pixel driving circuit 300. The electroluminescent element array includes a first electrode pattern, a second electrode pattern, and an electroluminescent layer 230 disposed between the first electrode pattern and the second electrode pattern. The first electrode pattern includes a plurality of first electrodes 210, wherein each of the first electrodes 210 is connected to a corresponding pixel driving circuit 300.

The display substrate further includes a plurality of touch signal lines, the second electrode pattern includes a plurality of second electrodes 220, and the second electrodes 220 are connected to the touch signal lines and function as touch electrodes.

The display substrate provided by the present disclosure can make driving compensation on the voltage of the second energy storage end in a touch phase, so as to maintain that driving current generated by the driving unit does not vary with time. In this way, in the touch phase, the luminance of a driven electroluminescent element does not vary with time, thereby avoiding affecting light emission display of the driven electroluminescent element.

In the embodiments of the present disclosure, the electroluminescent element array on the display substrate includes a plurality of electroluminescent elements, correspondingly, the first electrode pattern of the electroluminescent element array may include a corresponding number of the first electrodes 210, the first electrodes 210 of each electroluminescent element are correspondingly connected to a pixel driving circuit 300 and make light emission display under the drive of the pixel driving circuit 300. One electroluminescent element and one pixel driving circuit 300 constitute one pixel unit. Furthermore, a plurality of display drive signal lines for controlling each pixel driving circuit 230 may also be formed on the display substrate. Each second electrode 220 in the second electrode pattern functioning as a touch electrode does not necessarily fit to one pixel unit in size because the requirement for touch accuracy is lower than pixel resolution, that is, a plurality of pixel units may share one second electrode 220.

See FIG. 8, the structure of one pixel unit in the display substrate provided by the present disclosure may include a base 100, a first electrode 210 formed on the base 100, a second electrode 220, and an electroluminescent layer 230 disposed between the first electrode 210 and the second electrode 220. The first electrode 210 and the second electrode 220 and the electroluminescent layer 230 disposed thereon jointly achieve electroluminescence. It is further comprised a pixel driving circuit 300 connected to the first electrode 210.

Figure 9:
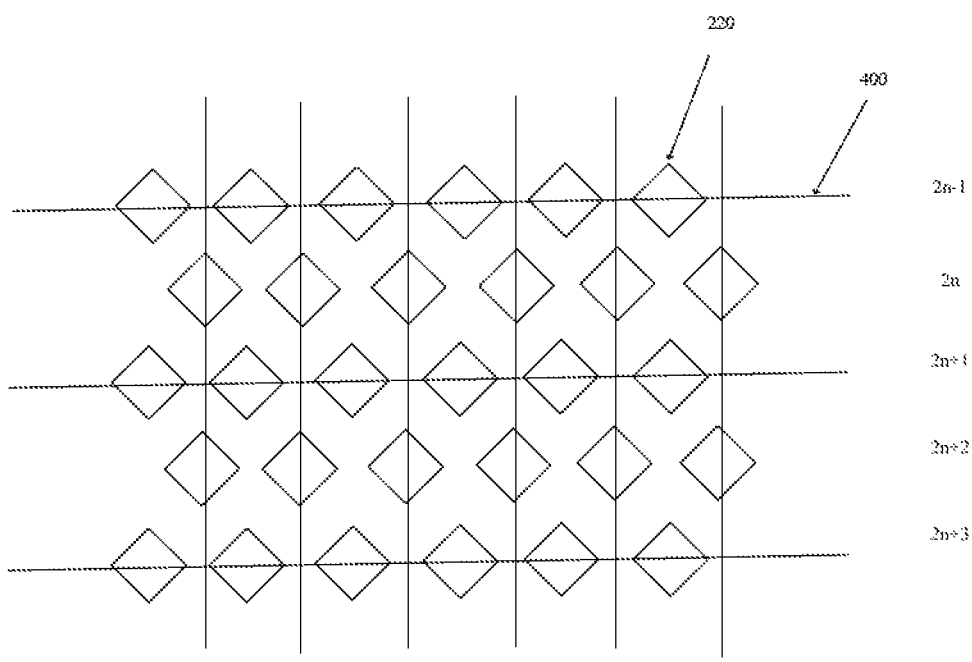
FIG. 9 is a schematic diagram of a connection relation between a pixel unit and a touch signal line in the display substrate according to the second embodiment of the present disclosure.

FIG. 9 is a schematic diagram of a connection relation between a pixel unit and a touch signal line in the display substrate according to the second embodiment of the present disclosure. FIG. 9 is a diagram showing connection relation between each second electrode 220 in the second electrode pattern and a touch signal line 400, second electrodes 220 in odd-numbered rows (2n−1, 2n+1 and 2n+3) are interlaced in location with second electrodes 220 in even-numbered rows (2n and 2n+2). In each odd-numbered row, the second electrodes 220 in the same row are connected to a touch signal line 400 in the same row direction. In even-numbered rows, the second electrodes 220 in the same column are connected to a touch signal line 400 in the same column direction. In specific application, when a finger touches any location, electric charges stored on second electrodes 220 (including second electrodes 220 connected to touch signal lines 400 in column direction and second electrodes 220 connected to touch signal lines 400 in row direction) adjacent to the location may change, and such change may be detected through touch signal lines 400 connecting these second electrodes 220, thereby determining a touch location. Odd-numbered rows and even-numbered rows are used for distinguishing two adjacent rows of second electrodes 220 for ease of description, not for limiting locations of rows of second electrodes 220, that is, the technical solutions of the present disclosure still hold true even though the foregoing odd-numbered rows and even-numbered rows in the description are exchanged.

Generally, the first electrode 210 here is the anode of an electroluminescent element 200, and the second electrode 220 is the cathode of the electroluminescent element 200. The electroluminescent element 200 may be OLED in FIG. 2.

FIG. 8 and FIG. 9 are merely schematic diagram of the display substrate according to the present disclosure, in practical application, the pixel driving circuit 300 likely includes a plurality of transistors, and thus the schematic structures shown in FIG. 8 and FIG. 9 shall not constitute a limitation on the protection scope of the present disclosure.

In the embodiments of the present disclosure, the touch signal lines here may be simultaneously fabricated while various components (for example, capacitors, transistors and so on) in the pixel driving circuit are fabricated. Further, in some cases, the foregoing pixel driving circuit, the first electrode pattern and the electroluminescent layer 230 may be fabricated on a backplate, the second electrode pattern may be fabricated on a cover plate, and in such a case, the touch signal lines may be fabricated on the backplate.

A third embodiment of the present disclosure provides a method for driving the foregoing display substrate, and the method includes a light emission phase which comprises a touch phase.

In the touch phase of the light emission phase, a touch drive signal is applied to second electrodes in the second electrode pattern through the touch signal line, and the touch driving compensation unit is controlled through the display signal line to make driving compensation on the voltage of the second energy storage end, so as to maintain that electric current generated by the driving unit does not vary with time.

By using the driving method, driving compensation is made on the voltage of the second energy storage end in a touch phase, so that driving current generated by the driving unit 310 does not vary with time. In this way, in the touch phase, luminance of a driven electroluminescent element does not vary with time, thereby avoiding affecting light emission display of the driven electroluminescent element.

Further, the driving method may also include in a touch phase, a difference value between the voltage of a display drive signal applied to each display signal line and the voltage of the touch drive signal does not vary with time.

This may reduce transmission delay of a touch drive signal between a touch signal line and a second electrode, which is caused by capacitance between the second electrode and the touch signal line and each signal line. Specifically, in the touch phase, a display drive signal applied to each display signal line has a certain voltage fluctuation, the voltage fluctuation synchronously changes with the voltage of the touch drive signal applied to the second electrode, and an amplitude of the fluctuation the voltage is the same as variation of the voltage of the touch drive signal. In this way, a difference value between the voltage of a display drive signal and the voltage of the touch drive signal is a constant value, thereby avoiding capacitance between the second electrode and each signal line from changing, and reducing delay arisen therefrom.

The embodiments of the present disclosure further provide a display device which includes the foregoing display substrate.

The display device here may be any product or component having display function, such electronic paper, a mobile phone, a tablet computer, a TV set, a display, a notebook computer, a digital photo frame, a navigation device and so on.

What is mentioned above merely refers to example embodiments of the present disclosure. It shall be pointed out that to those of ordinary skill in the art, various improvements and modifications may be made without departing from the technical principle of the present disclosure, and these improvements and modifications are also deemed to be within the protection scope of the present disclosure.

What is claimed is:

1. A pixel driving circuit comprising:
a driving unit,
a data voltage write unit,
an energy storage unit,
a threshold compensation unit,
a touch driving compensation unit, wherein: the energy storage unit comprises a first energy storage end and a second energy storage end, the driving unit is connected to the first energy storage end, and is configured to generate a driving current for driving an electroluminescent element connected to the pixel driving circuit according to a difference value between a voltage of the first energy storage end and a threshold voltage of the driving unit, the data voltage write unit is connected to the driving unit, and is configured to write a data voltage into the driving unit, the energy storage unit is configured to maintain a voltage difference between the first energy storage end and the second energy storage end when the first energy storage end is floating, the threshold compensation unit is connected to the driving unit and the first energy storage end, and is configured to compensate the voltage of the first energy storage end, such that the voltage equals to a sum of the data voltage and the threshold voltage, and the touch driving compensation unit is connected to the second energy storage end, and is configured to compensate a voltage of the second energy storage end in a touch phase, so as to maintain that the driving current generated by the driving unit does not vary with time, and
a reset unit, wherein the reset unit is connected to the first energy storage end and the second energy storage end, and wherein the reset unit is configured to reset the first energy storage end and the second energy storage end, wherein the reset unit comprises a fourth switching transistor, a fifth switching transistor, a fourth control signal input end, a fifth control signal input end, and a reset voltage input end, wherein a first electrode of the fourth switching transistor is connected to the second energy storage end, a second electrode of the fourth switching transistor is connected to the reset voltage input end, and a control electrode of the fourth switching transistor is connected to the fourth control signal input end, and wherein a first electrode of the fifth switching transistor is connected to the second energy storage end, a second electrode of the fifth switching transistor is connected to the first energy storage end, and a control electrode of the fifth switching transistor is connected to the fifth control signal input end.

2. The pixel driving circuit according to claim 1, wherein the touch driving compensation unit comprises a first switching transistor, a compensation voltage input end, and a first control signal input end, wherein a first electrode of the first switching transistor is connected to the compensation voltage input end, wherein a second electrode of the first switching transistor is connected to the second energy storage end, wherein a control electrode of the first switching transistor is connected to the first control signal input end, and wherein the compensation voltage input end is configured to input a touch drive signal.

3. The pixel driving circuit according to claim 1, wherein the driving unit comprises a drive transistor, and wherein a control electrode of the drive transistor is connected to the first energy storage end.

4. The pixel driving circuit according to claim 3, wherein the energy storage unit comprises a capacitor connected between the first energy storage end and the second energy storage end.

5. The pixel driving circuit according to claim 4, wherein the threshold compensation unit comprises a second switching transistor and a second control signal input end, wherein first electrode of the second switching transistor is connected to a second electrode of the drive transistor, wherein a second electrode of the second switching transistor is connected to the first energy storage end, wherein a control electrode of the second switching transistor is connected to the second control signal input end, wherein the data voltage write unit comprises a third switching transistor, wherein a data voltage writing end and a third control signal input end, wherein a first electrode of the third switching transistor is connected to the data voltage writing end, wherein a second electrode of the third switching transistor is connected to a first electrode of the drive transistor, and wherein a control electrode of the third switching transistor is connected to the third control signal input end.

6. The pixel driving circuit according to claim 5, wherein the second control signal input end and the third control signal input end are the same control signal input end, and wherein voltages for turning on the second switching transistor and the third switching transistor are the same.

7. The pixel driving circuit according to claim 4, further comprising a light emission control unit, wherein the light emission control unit is connected to the driving unit, and wherein the light emission control unit is configured to control the input of an electric current generated by the driving unit to the electroluminescent element.

8. The pixel driving circuit according to claim 7, wherein the light emission control unit comprises a sixth switching transistor, a seventh switching transistor, a work voltage input end, and a sixth control signal input end, wherein a first electrode of the sixth switching transistor is connected to the work voltage input end, and a second electrode of the sixth switching transistor is connected to the second electrode of the third switching transistor and the first electrode of the drive transistor, wherein a first electrode of the seventh switching transistor is connected to the first electrode of the second switching transistor and the second electrode of the drive transistor, a second electrode of the seventh switching transistor is connected to the electroluminescent element, and wherein voltages for turning on the sixth switching transistor and the seventh switching transistor are the same, and the sixth control signal input end and the seventh control signal input end are the same control signal input end.

9. The pixel driving circuit according to any claim 4, wherein all the switching transistors and the drive transistor are P-type transistors, wherein the control electrode of each of the P-type transistors is a gate electrode, wherein the first electrode is a source electrode, and wherein the second electrode is a drain electrode.

10. A display substrate comprising:
a base having an electroluminescent element array formed on the base,
a pixel driving circuit array configured to drive each electroluminescent element in the electroluminescent element array, and
a plurality of display signal lines, wherein: the pixel driving circuit array comprises a plurality of pixel driving circuits, wherein a pixel driving circuit of the plurality of pixel driving circuits comprises:
a driving unit,
a data voltage write unit, an energy storage unit,
a threshold compensation unit,
a touch driving compensation unit, wherein: the energy storage unit comprises a first enemy storage end and a second energy storage end, the driving unit is connected to the first energy storage end, and is configured to generate a driving current for driving an electroluminescent element connected to the pixel driving circuit according to a difference value between a voltage of the first energy storage end and a threshold voltage of the driving unit, the data voltage write unit is connected to the driving unit, and is configured to write a data voltage into the driving unit, the energy storage unit is configured to maintain a voltage difference between the first energy storage end and the second energy storage end when the first energy storage end is floating, the threshold compensation unit is connected to the driving unit and the first energy storage end, and is configured to compensate the voltage of the first energy storage end, such that the voltage equals to a sum of the data voltage and the threshold voltage, and the touch driving compensation unit is connected to the second energy storage end, and is configured to compensate a voltage of the second energy storage end in a touch phase, so as to maintain that the driving current generated by the driving unit does not vary with time, and
a reset unit, wherein the reset unit is connected to the first energy storage end and the second energy storage end, and wherein the reset unit is configured to reset the first energy storage end and the second energy storage end, wherein the reset unit comprises a fourth switching transistor, a fifth switching transistor, a fourth control signal input end, a fifth control signal input enol and a reset voltage input end, wherein a first electrode of the fourth switching transistor is connected to the second energy storage end, a second electrode of the fourth switching transistor is connected to the reset voltage input end, and a control electrode of the fourth switching transistor is connected to the fourth control signal input end, wherein a first electrode of the fifth switching transistor is connected to the second energy storage end, a second electrode of the fifth switching transistor is connected to the first energy storage end, and a control electrode of the fifth switching transistor is connected to the fifth control signal input end, and
wherein the plurality of display signal lines are respectively connected to the input ends in the pixel driving circuit, the electroluminescent element array comprises a first electrode pattern, a second electrode pattern, and an electroluminescent layer disposed between the first electrode pattern and the second electrode pattern, the first electrode pattern comprises a plurality of first electrodes, wherein each of the first electrodes is connected to the corresponding pixel driving circuit, and the display substrate further comprises a plurality of touch signal lines, the second electrode pattern comprising a plurality of second electrodes, the second electrodes connected to the touch signal lines and functioning as touch electrodes.

11. The display substrate according to claim 10, wherein the second electrodes in the second electrode pattern are divided into a plurality of rows, wherein the second electrodes in odd-numbered rows and the second electrodes in even-numbered rows are disposed in a staggered manner in a column direction, wherein the second electrodes in each odd-numbered row are connected to the same touch signal line, and wherein the second electrodes in the even-numbered rows and in the same column are connected to the same touch signal line.

12. A method for driving the display substrate according to claim 10, comprising a light emission phase which comprises a touch phase, wherein in the touch phase of the light emission phase, a touch drive signal is applied to the second electrodes in the second electrode pattern through the touch signal lines, and the touch driving compensation unit is controlled through the display signal lines to compensate the voltage of the second energy storage end, so as to maintain that the electric current generated by the driving unit does not vary with time.

13. The method according to claim 12, wherein in the touch phase, a difference value between the voltage of the display drive signal applied to each display signal line and the voltage of the touch drive signal does not vary with time.

14. A display device, comprising the display substrate according to claim 10.

15. The display substrate according to claim 10, wherein the touch driving compensation unit comprises a first switching transistor, a compensation voltage input end, and a first control signal input end, wherein a first electrode of the first switching transistor is connected to the compensation voltage input end, wherein a second electrode of the first switching transistor is connected to the second energy storage end, a control electrode of the first switching transistor is connected to the first control signal input end, and wherein the compensation voltage input end is configured to input a touch drive signal.

16. The display substrate according to claim 10, wherein the driving unit comprises a drive transistor, and wherein a control electrode of the drive transistor is connected to the first energy storage end.

17. The display substrate according to claim 16, wherein the energy storage unit comprises a capacitor connected between the first energy storage end and the second energy storage end.

18. The display substrate according to claim 17, wherein the threshold compensation unit comprises a second switching transistor and a second control signal input end, wherein a first electrode of the second switching transistor is connected to a second electrode of the drive transistor, wherein a second electrode of the second switching transistor is connected to the first energy storage end, wherein a control electrode of the second switching transistor is connected to the second control signal input end, wherein the data voltage write unit comprises a third switching transistor, a data voltage writing end, and a third control signal input end, wherein a first electrode of the third switching transistor is connected to the data voltage writing end, wherein a second electrode of the third switching transistor is connected to a first electrode of the drive transistor, and wherein a control electrode of the third switching transistor is connected to the third control signal input end.

* * * * *

UNITED STATES PATENT AND TRADEMARK OFFICE
CERTIFICATE OF CORRECTION

Page 1 of 1

PATENT NO. : 10,068,524 B2
APPLICATION NO. : 15/118389
DATED : September 4, 2018
INVENTOR(S) : Shengji Yang et al.

It is certified that error appears in the above-identified patent and that said Letters Patent is hereby corrected as shown below:

In the Claims

In Claim 10, Column 15, Line 4, delete "first enemy storage end" and insert therefor -- first energy storage end --.
In Claim 10, Column 15, Line 36, delete "input enol and a reset" and insert therefor -- input end, and a reset --.

Signed and Sealed this
Fifteenth Day of January, 2019

Andrei Iancu
*Director of the United States Patent and Trademark Office*